United States Patent
Moulton

(10) Patent No.: US 7,011,745 B1
(45) Date of Patent: Mar. 14, 2006

(54) ROTATING PERFORATED CYLINDER TREATMENT SYSTEM

(76) Inventor: Patrick L. Moulton, 506 Perry St., Prescott, AZ (US) 86303

( * ) Notice: Subject to any disclaimer, the term of this patent is extended or adjusted under 35 U.S.C. 154(b) by 83 days.

(21) Appl. No.: 10/618,533

(22) Filed: Jul. 11, 2003

Related U.S. Application Data

(60) Provisional application No. 60/395,262, filed on Jul. 11, 2002.

(51) Int. Cl.
*C02F 1/58* (2006.01)

(52) U.S. Cl. ............ 210/150; 210/199; 210/205; 261/92; 261/DIG. 71; 366/305; 366/328.2

(58) Field of Classification Search ............ 210/619, 210/150, 151, 201, 202, 205, 209, 216, 199, 210/219; 261/92, DIG. 71; 435/294.1, 298.2; 366/305, 328.2
See application file for complete search history.

(56) References Cited

U.S. PATENT DOCUMENTS

| | | | |
|---|---|---|---|
| 2,382,605 A | 8/1945 | Carter, Jr. ............ 259/9 |
| 2,996,429 A * | 8/1961 | Toulmin, Jr. ............ 435/391 |
| 3,416,776 A | 12/1968 | Gamer ............ 261/122 |
| 3,547,815 A | 12/1970 | McWhirter ............ 210/7 |
| 3,956,127 A * | 5/1976 | Holmberg ............ 210/150 |
| 4,160,736 A | 7/1979 | Prosser ............ 210/150 |
| 4,364,826 A | 12/1982 | Kato ............ 210/150 |
| 4,522,714 A * | 6/1985 | Thissen ............ 210/150 |
| 4,540,491 A * | 9/1985 | Zimmer ............ 210/619 |
| 4,729,828 A * | 3/1988 | Miller ............ 210/150 |
| 4,749,497 A * | 6/1988 | Kanzleiter et al. ............ 210/721 |
| 5,246,854 A * | 9/1993 | O'Brien et al. ............ 435/286.5 |
| 5,538,630 A * | 7/1996 | Burns ............ 210/198.1 |
| 6,572,774 B1 * | 6/2003 | Ricketts ............ 210/619 |
| 2002/0113010 A1 | 8/2002 | Ricketts ............ 210/615 |

FOREIGN PATENT DOCUMENTS

| | | |
|---|---|---|
| JP | 55-64893 | 5/1980 |
| JP | 58-06294 | 1/1983 |
| JP | 58-76183 | 5/1983 |

* cited by examiner

*Primary Examiner*—Peter A. Hruskoci
(74) *Attorney, Agent, or Firm*—Sierra Patent Group, Ltd.

(57) ABSTRACT

The disclosed device is directed toward a rotary water treatment system comprising at least one open channel cell configured to contain a liquid. A cylinder partially disposed in the open channel cell. The cylinder having a first end and a second end opposite the first end, and a cylinder wall coupled between the first end and the second end. The cylinder wall including a plurality of perforations formed in the cylinder wall. A motive force element is coupled to the cylinder configured to impart rotary motion to the cylinder. At least one influent supply is coupled to the at least one open cell. At least one effluent discharge is coupled to the at least one open cell. A pump is fluidly coupled to the at least one influent supply.

27 Claims, 3 Drawing Sheets

ROTATING PERFORATED CYLINDER TREATMENT SYSTEM

PRIORITY CLAIM

This application claims priority to Provisional Patent Application No. 60/395,262 filed with the United States Patent and Trademark Office on Jul. 11, 2002.

BACKGROUND

The present disclosure relates to treatment systems, specifically to a low-energy treatment system for low-flow acid and alkaline drainage located in remote areas.

The precipitation of heavy metals from acidic or alkaline metal-laden water requires large amounts of dissolved oxygen to complete chemical reactions at certain pH plateaus. Complete oxidation of the heavy metal precipitant is key to producing a stable metal precipitant, thereby producing a stable filtered or decanted water for discharge after treatment. Reduced environments (dissolved oxygen deficient) remain unstable and the final pH and or residual metal content of the discharge water is unpredictable.

Air compressors and paddle type agitators used in prior art heavy metal treatment systems consume large amounts of energy during the oxidation and agitation phases of heavy metal precipitation. The efficiency of compressed air bubblers, used in aerating metal laden waters, depend on bubble size and the distribution of these bubbles in the water during the treatment phases. Agitation of the heavy metal laden waters with paddle type or propeller type blades require large amounts of energy, as they operate within tanks and move large amounts of water, in order to assure adequate introduction and mixing of oxygen enriched waters and pH adjusting reagents during treatment of heavy metal laden waters.

The prior art treatment systems rely on air compressors to add atmosphere to the heavy metal laden waters in order to raise the dissolved oxygen content of the water during treatment phases. Efficiency of the compressed air and the absorption of oxygen by the heavy metal laden water during treatment, depends on bubble size and the distribution of these bubbles within the prior art deep tanks. Excess amounts of compressed atmosphere must be added to insure that adequate oxygen is absorbed by the heavy metal laden water during the treatment and formation of the precipitants. This requires large amounts of energy to be expended in order to insure adequate oxidation takes place. Additionally, the remote nature of many impacted sites that require treatment systems often lack commercial electrical power.

Paddle type agitators used in prior art treatment systems move slowly within deep tanks and are largely unable to liberate the coated and un-reacted alkalinity providing reagent, thereby requiring the additional addition of reagent, to compensate for the un-reacted reagent previously added. The efficiency of the ionic exchange is also compromised as the large sized particle is not as efficient as a small particle during the formation of the precipitant. Prior art paddle type agitators also require and consume large amounts of energy as they have to move large amounts of water within deep tanks.

What is needed in the art is a treatment system designed to improve the efficiency of the oxidation and agitation phases of heavy metal precipitation during treatment, while utilizing a low-energy consumption power source.

SUMMARY

The disclosed device is directed toward a treatment system. The treatment system comprises a first container comprising a first end and a second end opposite the first end, a first container wall disposed between the first end and the second end. The first end, the container wall and the second end define a first interior and a first exterior. The first end, the container wall and the second end define a first container opening. A second container is fluidly coupled to the first container. The second container comprises a first end and a second end opposite the first end, a second container wall disposed between the first end and the second end. The first end, the container wall and the second end define a second interior and a second exterior. The first end, the container wall and the second end define a second container opening. A first aerator is partially disposed in the first interior through the first container opening. The first aerator comprises a body having a first end and a second end opposite the first end. The body comprises an aerator wall disposed between the first end and the second end. The aerator wall includes a plurality of perforations through the aerator wall. The first end, the second end and the aerator wall define a first aerator interior and a first aerator exterior. The first aerator configured to partially rotatably dispose in a liquid contained in the interior of the first container. The first aerator is configured to aerate the liquid both at the first aerator interior and the first aerator exterior. A second aerator is partially disposed in the second interior through the second container opening. The second aerator comprises a body having a first end and a second end opposite the first end. The body comprises an aerator wall disposed between the first end and the second end. The aerator wall includes a plurality of perforations through the aerator wall. The first end, the second end and the aerator wall define a second aerator interior and a second aerator exterior. The second aerator is configured to partially rotatably dispose in a liquid contained in the interior of the second container. The second aerator is configured to aerate the liquid both at the second aerator interior and the second aerator exterior. A rotary motive force element is operatively coupled to the first aerator and the second aerator. The rotary motive force element is configured to rotate the first aerator and the second aerator.

Another embodiment of the disclosed device is directed toward a rotary water treatment system comprises at least one open channel cell configured to contain a liquid. A cylinder partially disposed in the open channel cell. The cylinder having a first end and a second end opposite the first end, and a cylinder wall coupled between the first end and the second end. The cylinder wall including a plurality of perforations formed in the cylinder wall. A motive force element is coupled to the cylinder configured to impart rotary motion to the cylinder. At least one influent supply is coupled to at least one open cell. At least one effluent discharge is coupled to the at least one open cell. A pump is fluidly coupled to the at least one influent supply.

A method of treating a liquid is disclosed. The method of treating a liquid comprises flowing the liquid through an influent supply into at least one open channel cell. The method includes rotating a cylinder through the liquid. The cylinder is partially disposed in at least one open channel cell. The cylinder comprises a first end and a second end opposite the first end and a perforated cylinder wall coupled between the first end and the second end. The first end, the perforated cylinder wall and the second end define an interior and an exterior of the cylinder. The method includes lifting the liquid from at least one open channel cell onto the perforated cylinder wall at an interior surface and an exterior surface of the perforated cylinder wall. The method includes exposing the liquid to air from the exterior of the cylinder and the interior of the cylinder. The method includes flowing a treated liquid out of at least one open channel cell through an effluent discharge.

BRIEF DESCRIPTION OF THE DRAWINGS

Referring now to the figures, wherein like elements are numbered the same.

DETAILED DESCRIPTION

Persons of ordinary skill in the art will realize that the following description of the present disclosure is illustrative only and not in any way limiting. Other embodiments of the invention will readily suggest themselves to such skilled persons having the benefit of this disclosure.

The present disclosure describes a water treatment system for treating contaminated water, such as a heavy metal-laden water supply. In order to efficiently add dissolved oxygen from the atmosphere into a reduced environment of heavy metal laden waters (oxygen deficient) the surface of the water must be exposed to the atmosphere. An exemplary treatment system disclosed herein includes perforated rotating cylinders in order to exploit the surface tension properties of water, by lifting a thin film of the water from the cells and carrying the water on both the inside and outside surfaces of the rotating perforated cylinders. The perforations of the cylinders are "bridged" by a thin film of water as they rotate. This thin film of water absorbs oxygen from the atmosphere and effectively and efficiently raises the dissolved oxygen content of the heavy metal laden water.

One exemplary system operates with a flow rate of about 5 gpm of heavy metal laden water, with the perforated cylinders rotating at about 60 rpm, effectively distributes the influent over a total surface area of about 50,868 square feet.

The leading edge of the perforated cylinders, while rotating, also creates a cascading bubbling waterfall type action or, turbulent flow as the excess water that is lifted by the perforations is drained off of the cylinders. This cascading action also effectively and efficiently adds dissolved oxygen to the reduced environment (oxygen deficient) waters contained within the cells. The rotating action of the cylinders within the cells effectively and efficiently add large amounts of dissolved oxygen from the atmosphere, to the contained water in the cell, while thoroughly mixing the reduced and oxygen rich waters together, thereby raising the dissolved oxygen content of the contained waters.

Figure 1:
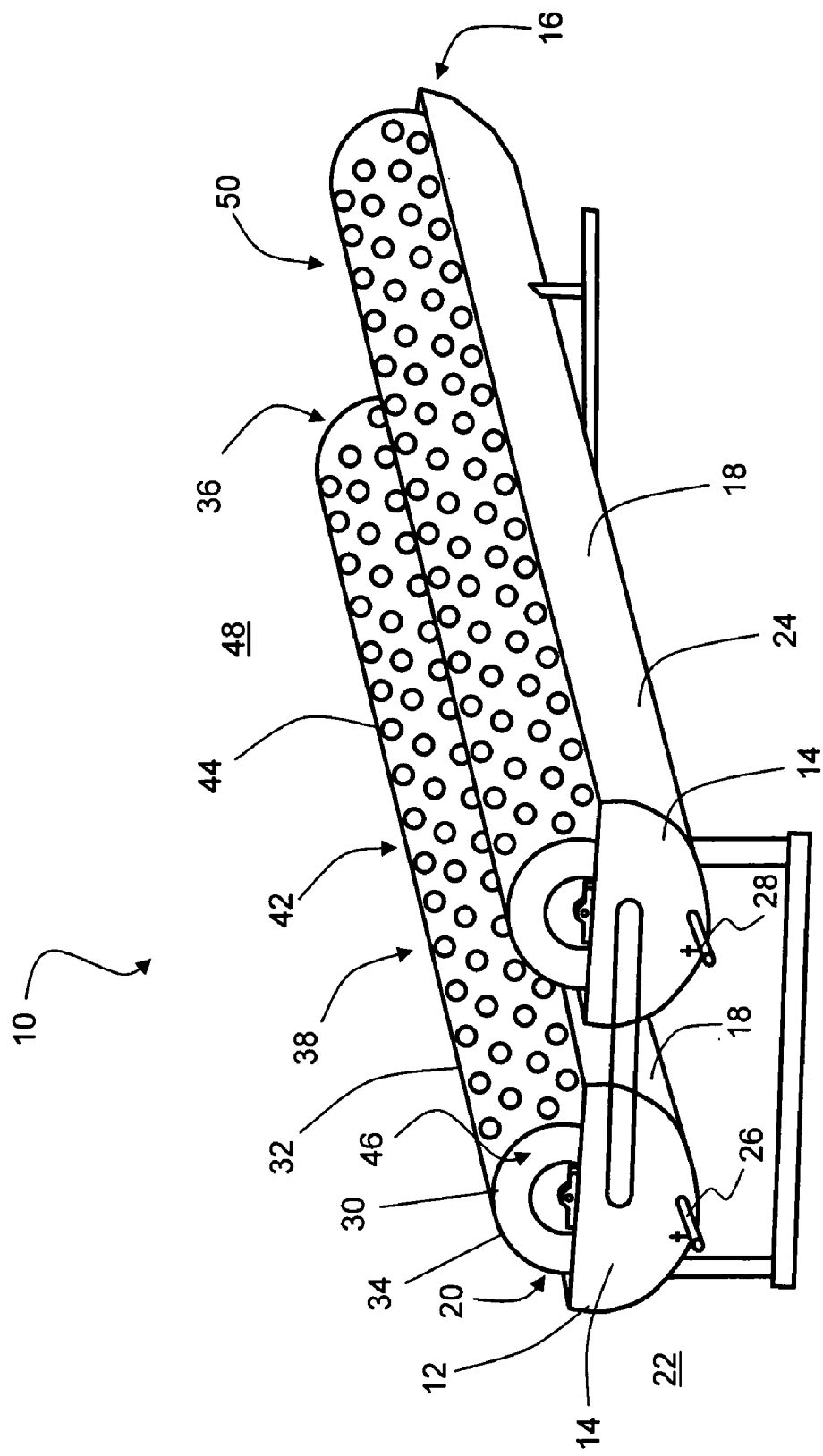
FIG. 1 is a perspective view of an exemplary treatment system.
Figure 2:
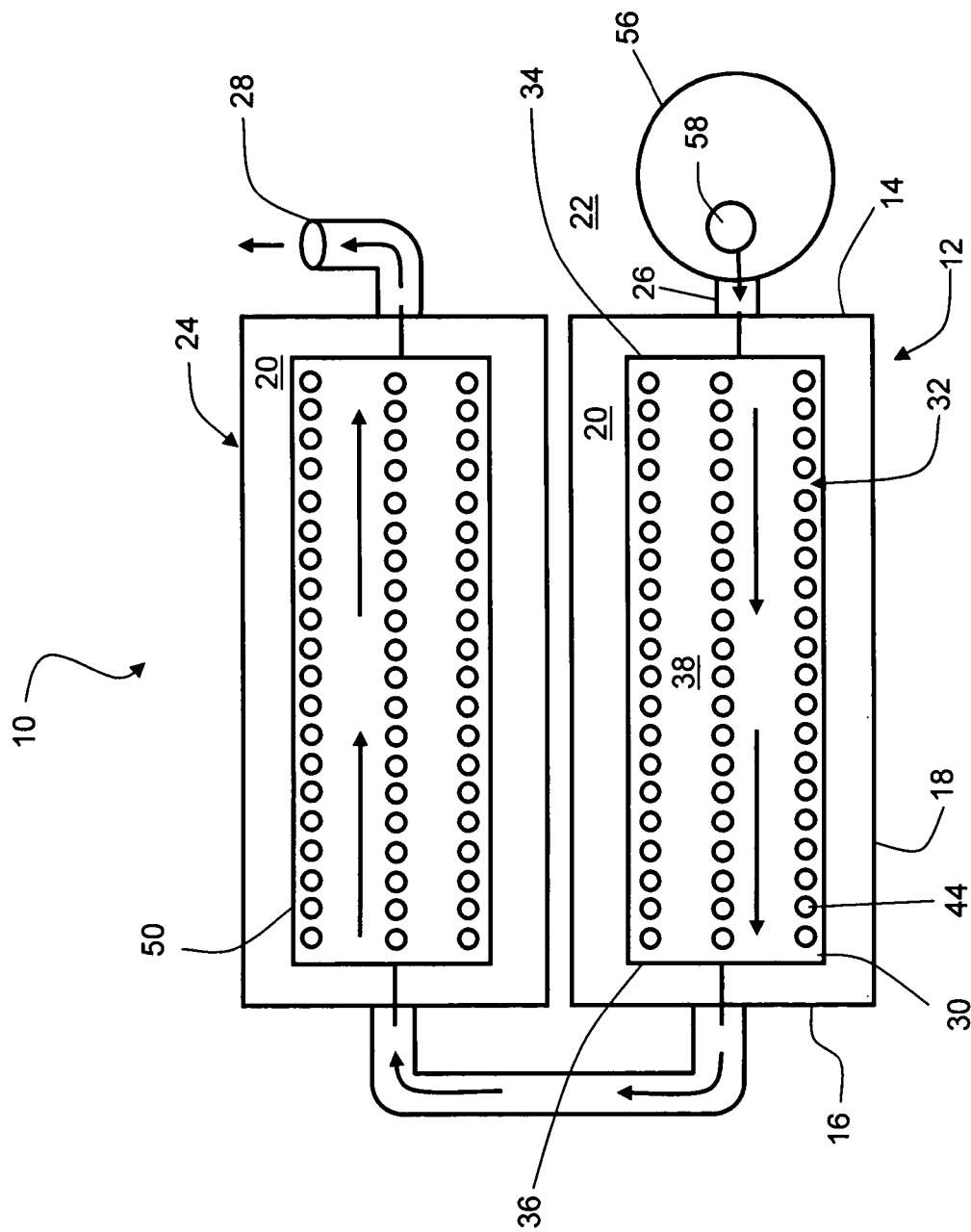
FIG. 2 is a plan view of an exemplary treatment system.
Figure 3:
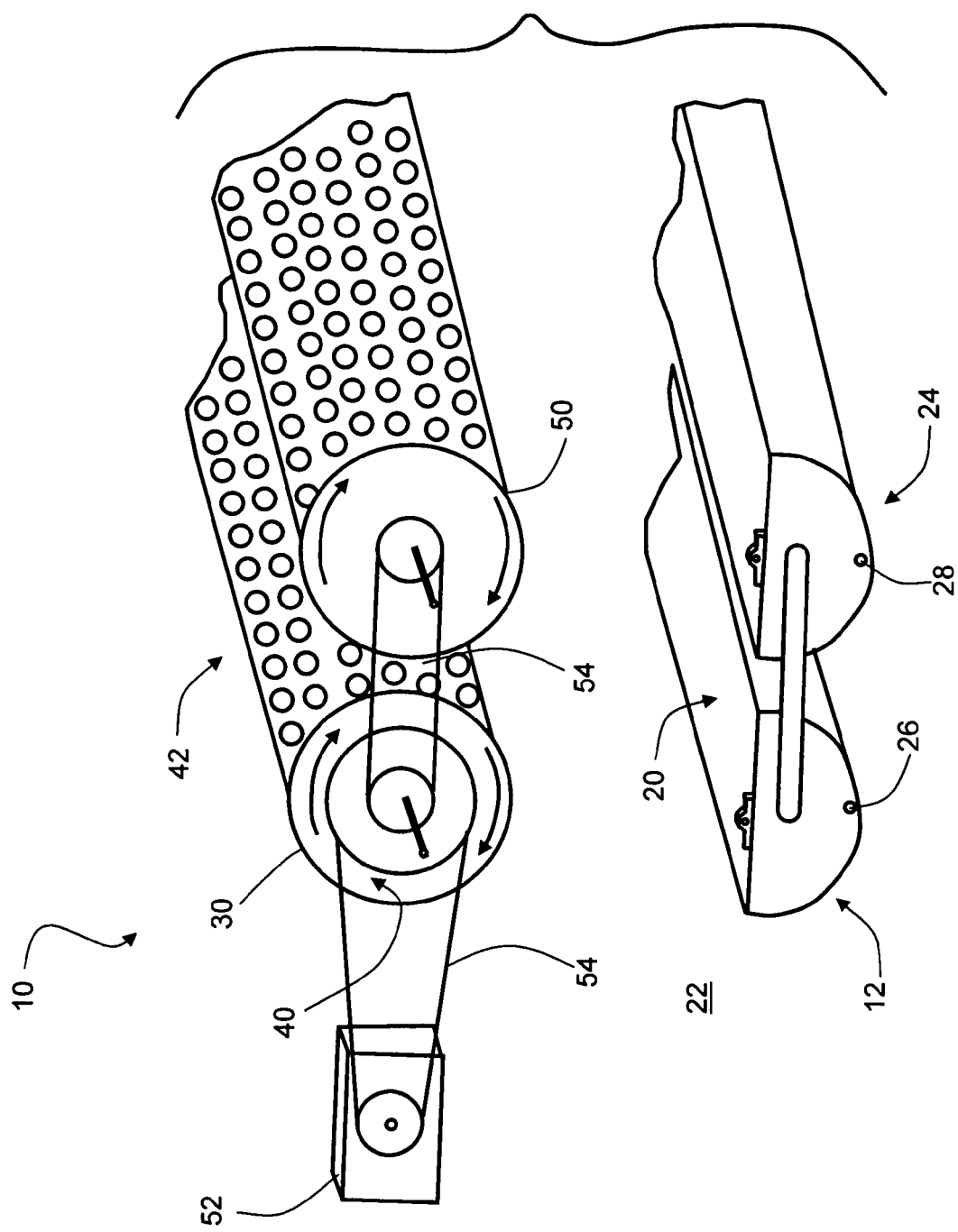
FIG. 3 is a partial perspective view of an exemplary treatment system.

Referring to FIGS. 1, 2 and 3 a perspective view, a top view and a partial perspective view of an exemplary treatment system are illustrated. The treatment system 10 is shown in part without some of the subcomponents. The treatment system 10 includes at least one container (a first container or in an exemplary embodiment, an open channel cell) 12 preferably in a semi-cylinder shape. The container 12 includes a first end 14 and a second end 16 opposite the first end 14. A container wall 18 is disposed between the first end 14 and the second end 16 to define an interior 20 and an exterior 22. In an exemplary embodiment, the container 12 is an open-topped semi-circular cell having about a ten foot length and about an eighteen inch diameter. The total depth of the container 12 can be about nine inches and have a capacity of about sixty-six gallons. When the exemplary treatment system 10 is in operation, the depth of a liquid contained in the container 12 can be about five inches equaling a volume of about thirty-five gallons. The container 12 can be made of PVC or non-reactive corrosive resistant material. The container 12 is configured to contain liquid. The liquid is to be treated in the treatment system 10 and can comprise one of an acidic metal-laden water and an alkaline metal-laden water.

In an exemplary embodiment, the treatment system 10 includes another or second container 24 fluidly coupled (plumbed) to the first container 12. The second container 24 includes the same physical features as the first container 12. The first container 12 and second container are plumbed together to allow liquid to flow from an influent supply 26 through the first container to the second container 24 and to an effluent discharge 28 (See flow arrows in FIG. 2). In an exemplary embodiment, the effluent discharge can be a sediment bag. The liquid can flow along the length of each cell 12, 24. In an exemplary embodiment, the containers 12, 24 are plumbed to allow for influent and effluent to flow at various elevations or depths in the containers 12, 24.

An aerator (or first aerator) 30 is configured to be disposed in the container 12. The aerator 30 includes a body 32 having a first end 34 and a second end 36 opposite the first end 34. An aerator wall 38 is disposed between the first end 34 and the second end 36. The aerator wall 38 includes an interior surface 40 and an exterior surface 42 opposite the interior surface 40. The aerator wall 38 includes a plurality of perforations 44 formed in the aerator wall 38. The perforations 44 allow fluid communication between the interior surface 40 and the exterior surface 46. In a preferred embodiment, the perforations are one-half inch diameter holes formed in the aerator wall 38. The first end 34, aerator wall 38 and second end 36 define an aerator interior 46 and an aerator exterior 48. The aerator 30 is configured to be partially disposed in the liquid contained in the interior 20 of the container 12. The aerator 30 is only partially immersed in the liquid in the container 12. The aerator 30 is configured to rotate about a longitudinal axis of the body 32 (See rotational arrows at FIG. 3). The aerator 30 rotates through the liquid in the container 12. As the liquid penetrates the perforations 44, the liquid wets both the interior surface 40 of the aerator 30 and the exterior surface of the aerator 30. While the aerator 30 rotates through the liquid, the liquid is aerated, (i.e., exposed to air).

A second aerator 50 having similar features to the first aerator 30 is disposed in the second container 24. The second aerator 50 is also rotatably partially disposed in the interior 20 of the second container 24. In an exemplary embodiment, the aerator 30, 50 is a PVC cylinder 30 having a first end 34 and second end 36 coupled to a cylinder wall 38 similar to the aerator wall 38. The cylinder 30 has a fifteen inch diameter and a nine foot length. The cylinder 30 has about 4,200 one-half inch diameter holes 44 through the cylinder wall 38.

As illustrated in FIG. 3, a motive force element 52 is operatively coupled to the first aerator 30 and in exemplary embodiments, also coupled to the second aerator 50. The motive force element 52 is configured to rotate the aerator(s) 30, 50. In an exemplary embodiment, the motive force element 52 imparts rotary motion to the cylinder(s) 30, 50. A drive belt 54 and drive pulley arrangement can be employed to rotate the cylinder(s) 30, 50. In an exemplary embodiment, the motive force element is a 110 volt, 1.7 amp gear reduced ac motor rotating the cylinder(s) 30, 50 at about 60 rpm.

A tank or reservoir 56 can be coupled to the influent supply 26 to provide a source of liquid to the treatment system 10. In an exemplary embodiment, the tank 56 can be a flash reaction tank. A pump 58 can be employed to pump the liquid to the influent supply 26 from the tank 56. In an exemplary embodiment, the pump can be a 5 gpm, 15 amp, 110 watt pump.

Exemplary Treatment System Test Results

Test results from an exemplary treatment system using acidic heavy metal laden water from a mine site in northeastern Nevada are as follows:

Dissolved oxygen contents of samples drawn from the mine site are consistently one (1) milligram per liter (mg) or less. A single pass of the acidic heavy metal laden water through the system, at a flow rate of 5 gpm, raised the dissolved oxygen content 800 to 900 percent. Dissolved oxygen levels rose from less than 1 mg/l to 8.5 mg/l or higher. The acidic metal laden waters were circulated through the system for as long as 3 hours, with no apparent improvement over the single pass, which takes approximately 15 minutes.

The removal of heavy metals from acidic, reduced environment water requires raising the pH of the impacted waters with an alkalinity providing reagent (e.g., lime slurry (CaOH2) or Sodium Hydroxide (NAOH) to remove (precipitate) the heavy metals from the impacted water. Either of these reagents are commonly the used in the treatment of heavy metal contaminated water. These tests were conducted using lime slurry (CaOH2) as the alkalinity providing reagent for the precipitation of the heavy metals from the impacted waters.

Test results showed that when the treated water and aerated water had a final dissolved oxygen content of less than 6 mg/l, the treated solution had an unstable and unpredictable final pH and residual heavy metal content after treatment. Tests results also showed that when the treated and aerated water had a final dissolved oxygen content of 6 mg/l or higher a stable pH and residual metal content after treatment was achieved. Following treatment the oxidized solution had a drop in pH of approximately 1 to 1.5 standard units (s.u.) after 12 hours. The dissolved oxygen content also dropped 1 mg/l to 3 mg/l while the chemical reactions were completed. Samples measured at up to five days after treatment have shown that the final pH and dissolved oxygen content remain stable after the preliminary drop.

Test results have shown that dissolved oxygen requirements and consumption for completing chemical reactions at certain pH plateaus are evident and predictable during treatment, reflecting the heavy iron content of the waters used during the tests. The pH plateau from 2.5 s.u. to 5.0 is relatively easy to achieve while remaining in an oxidized environment (dissolved oxygen content greater than 6 mg/1). The bulk of the heavy metal contaminates in the test waters are precipitated out of solution at a pH range between 5.0 s.u. and 8.0 s.u. in this series of tests. The pH plateau of 5.0 to 8.0 requires large amounts of dissolved oxygen in order to remain in an oxidized environment. The treatment system performed well in maintaining an "oxidized environment" during precipitation and sludge generation during treatment. The pH plateau of 8.0 to 10.0 was easily achieved while remaining in a oxidized environment as the remaining heavy metal concentration in the water was relatively low after the initial precipitation at pH 8.0 s.u. The testing of the prototype treatment system produced stable precipitants (heavy metal sludge) and clear discharge waters meeting or exceeding Federal EPA standards for secondary drinking water quality from heavily metal laden acidic mine waters in all of the tests performed.

The prototype treatment system was constructed and based on a flow rate of approximately 5 gpm of influent for testing purposes only. The final dimensions of the rotating perforated cylinder treatment system would be susceptible to several factors. Dissolved oxygen requirements at each site would vary, as the concentration of heavy metal contaminates in the impacted waters are different at each site. Dissolved oxygen requirements for precipitant formation will vary, depending upon the water chemistry and heavy metals removed by the treatment system. Flow rates of acid rock drainage and or alkaline rock drainage at each site are different and would require different sized rotating cylinders and cells and/or a series of cells required. Testing and optimization of the treatment system will be a determining factor on the physical size of the treatment system.

The rotating perforated cylinders and shallow cells used in this treatment system add large amounts of dissolved oxygen from the atmosphere with minimal energy expenditure and maximum efficiency.

Alkalinity providing reagents used in the treatment of heavy metal laden acidic waters are also efficiently and effectively agitated by the rotating perforated cylinders. The ionic exchange during precipitation of the heavy metals is also optimized by the rotating perforated cylinders action. The initial introduction of alkalinity providing reagents, into the heavy metal laden reduced environment, (flash reaction phase) produces a large sized particle precipitant. This large sized particle is mainly coated and un-reacted reagent. The rotating perforated cylinders agitate and pick this particle up and liberate the un-reacted reagent for an efficient ionic exchange during metal precipitation. While the ionic exchange is enhanced by the rotating perforated cylinders action, the oxidation process necessary for stable formation of precipitants, during the ionic exchange, is optimized by the particles being effectively exposed to the atmosphere in a thin film, thereby assuring complete oxidation of the precipitant during formation of the precipitant.

The rotating perforated cylinders and shallow cells used in the disclosed treatment system efficiently agitate and liberate the alkalinity providing reagent, while enhancing ionic exchange during the formation of the precipitant, with minimal energy expenditure and maximum efficiency.

In an exemplary treatment system, the power requirements have been tested and are extremely efficient compared to conventional treatments systems using air compressors and paddle or propeller type agitators. In the exemplary embodiment, the drive mechanism for the rotating perforated cylinders is a 110 volt ac gear reduced motor running at 1.7 full load amperes. The amperage consumption of the motor drops to approximately 1 ampere after the rotating cylinders reach an equilibrium turning at 60 rpm. A non-corrosive submersible pump rated at 5 gpm operating on 110 volts at 1.5 full load amps is used to circulate water through the cells. The operating amperage of the non-corrosive pump drops to approximately 1 ampere as the system is running. Operating energy consumption of the rotating perforated cylinder treatment system is approximately 2 amperes at 110 volts while in use.

A conventional treatment system, operating with an air compressor and paddle or propeller type agitator, at the same flow rate of 5 gpm, will consume at least 10 times more energy than the rotating perforated cylinder treatment system.

The exemplary prototype treatment system constructed and tested has proven to be an efficient and effective system in the treatment of acidic heavy metal laden waters. The low energy consumption of the system, the efficiency of oxygen addition, as well as ionic exchange optimization and efficient alkalinity reagent consumption is evident in the testing results. The energy consumption of this treatment system is far less than the energy consumption of conventional systems. The efficiency of the rotating perforated cylinders operating with shallow cells has proven to be efficient and effective.

The rotating perforated cylinder treatment system has to date only been tested with acidic heavy metal laden waters. The treatment system has the capabilities to be applied to alkaline heavy metal laden waters also. The working theories are basically the same however reagents and pH plateaus are different when an alkaline environment is treated rather than an acidic environment.

It is contemplated that in addition to the disclosed treatment system being configured to treat liquids, such as heavy metal-laden water, other impacted waters having contaminants can be treated. The treatment system can remove volatile organic compounds, regular metals, or merely aerate the water for low dissolved oxygen environments. The treatment system disclosed can also be employed to bioremediate liquids, such as contaminated water supplies, and the like.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A treatment system comprising:
a first container comprising a first end and a second end opposite said first end, a first container wall disposed between said first end and said second end, said first end, said container wall and said second end defining a first interior and a first exterior, said first end, said container wall and said second end defining a first container opening;
a second container fluidly coupled to said first container, said second container comprising a first end and a second end opposite said first end, a second container wall disposed between said first end and said second end, said first end, said container wall and said second end defining a second interior and a second exterior, said first end, said container wall and said second end defining a second container opening;
a first aerator partially disposed in said first interior through said first container opening, said first aerator comprising a body having a first end and a second end opposite said first end, said body comprising an aerator wall disposed between said first end and said second end, said aerator wall including a plurality of perforations through said aerator wall, said first end, said second end and said aerator wall defining a first aerator interior and a first aerator exterior, said first aerator configured to partially rotatably dispose in a liquid contained in said interior of said first container, said first aerator configured to aerate said liquid both at said first aerator interior and said first aerator exterior, wherein said plurality of perforations formed in the first aerator wall are configured to lift a thin film of said liquid from said first container by exploiting the surface tension of said liquid, wherein said thin film bridges said plurality of perforations, and said first aerator is configured to create a cascading bubbling turbulent flow in said liquid flowing along said first aerator wall, as well as said liquid contained in said first container;
a second aerator partially disposed in said second interior through said second container opening, said second aerator comprising a body having a first end and a second end opposite said first end, said body comprising an aerator wall disposed between said first end and said second end, said aerator wall including a plurality of perforations through said aerator wall, said first end, said second end and said aerator wall defining a second aerator interior and a second aerator exterior, said second aerator configured to partially rotatably dispose in a liquid contained in said interior of said second container, said second aerator configured to aerate said liquid both at said second aerator interior and said second aerator exterior, wherein said plurality of perforations formed in the second aerator wall are configured to lift a thin film of said liquid from said second container by exploiting the surface tension of said liquid, wherein said thin film bridges said plurality of perforations, and said second aerator is configured to create a cascading bubbling turbulent flow in said liquid flowing along said second aerator wall, as well as said liquid contained in said second container; and
a rotary motive force element operatively coupled to said first aerator and said second aerator, said rotary motive force element configured to rotate said first aerator and said second aerator.

2. The treatment system of claim 1 further comprising:
at least one influent supply fluidly coupled to one of said first container and said second container;
at least one effluent discharge fluidly coupled to one of said first container and said second container.

3. The treatment system of claim 2 wherein said at least one influent supply is fluidly coupled to one of said first container and said second container at a predetermined depth of said first container and said second container, said at least one effluent discharge is fluidly coupled to one of said first container and said second container at a predetermined depth of said first container and said second container.

4. The treatment system of claim 1 wherein said first aerator and said second aerator are substantially cylinders configured for rotary motion about a longitudinal axis formed along said cylinder from said first ends of said first and second aerators to said second ends of said first and second aerators.

5. The treatment system of claim 1 wherein said first container and said second container are substantially semi-cylinders configured for containing liquid in said first interior and said second interior along a longitudinal axis of said semi-cylinders.

6. The treatment system of claim 1 wherein said liquid comprises one of an acidic metal-laden water and an alkaline metal-laden water.

7. The treatment system of claim 1 wherein said plurality of perforations comprises about one-half inch diameter holes defined in said aerator wall.

8. The treatment system of claim 1 wherein said first aerator and said second aerator are configured to rotate through said liquid and lift said liquid on an interior surface and an exterior surface of said first aerator wall and said second aerator wall.

9. The treatment system of claim 1 wherein said plurality of perforations of said first aerator are configured to fluidly couple said first aerator interior with said first aerator exterior wetting an exterior surface and an interior surface of said first aerator wall with said liquid, and wherein said plurality of perforations of said second aerator are configured to fluidly couple said second aerator interior with said second aerator exterior wetting an exterior surface and an interior surface of said second aerator wall with said liquid.

10. The treatment system of claim 1 wherein said first aerator and said second aerator are configured to increase dissolved oxygen content of the liquid contained in said first container and said second container respectively.

11. The treatment system of claim 1 wherein said first aerator is configured to mix reduced liquid and oxygen rich liquid in said first container, wherein the mixture of said reduced liquid with the oxygen rich liquid increases dissolved oxygen content of said liquid contained in said first container and said second aerator is configured to mix reduced liquid and oxygen rich liquid in said second container, and wherein the mixture of said reduced liquid with the oxygen rich liquid increases dissolved oxygen content of said liquid contained in said second container.

12. The treatment system of claim 1 wherein said first container and said second container are configured to promote flow of said liquid through said first container to said second container.

13. The treatment system of claim 1 wherein said first aerator and said second aerator are configured to expose said liquid to air.

14. The treatment system of claim 1 wherein said first aerator is configured to immerse into said liquid contained in said first container a predetermined minimal depth, and said second aerator is configured to immerse into said liquid contained in said second container a predetermined minimal depth.

15. The treatment system of claim 1 wherein said first aerator is configured to agitate reagents in said liquid contained in said first container, and said second aerator is configured to agitate reagents in said liquid contained in said second container.

16. The treatment system of claim 1 wherein said first aerator is configured to increase the ionic exchange during precipitation of heavy metals in said liquid and said second aerator is configured to increase the ionic exchange during precipitation of heavy metals in said liquid.

17. The treatment system of claim 16 wherein said first and second aerators are configured to agitate and lift coated un-reacted reagent particles in said liquid and liberate said un-reacted reagent thereby increasing ionic exchange during metal precipitation.

18. The treatment system of claim 17 wherein said first and second aerators are configured to expose said reagent particles to air in a thin liquid film, wherein said precipitant is completely oxidized during precipitant formation.

19. The treatment system of claim 1 further comprising:
a pump fluidly coupled to one of said first container and said second container, said pump configured to circulate said liquid through said first container and said second container.

20. A rotary water treatment system comprising:
at least one open channel cell configured to contain a liquid;
a cylinder partially disposed in said open channel cell, said cylinder having a first end and a second end opposite said first end, and a cylinder wall coupled between said first end and said second end, said cylinder wall including a plurality of perforations formed in said cylinder wall, wherein said cylinder is configured to rotate through said liquid and lift a thin film of said liquid on an interior surface and an exterior surface of said cylinder wall by exploiting the surface tension of said liquid, wherein said thin film bridges said plurality of perforations, and said cylinder is configured to create a cascading bubbling turbulent flow in said liquid flowing along said cylinder wall, as well as said liquid contained in said at least one open channel cell;
a motive force element coupled to said cylinder configured to impart rotary motion to said cylinder;
at least one influent supply coupled to said at least one open cell;
at least one effluent discharge coupled to said at least one open cell; and
a pump fluidly coupled to said at least one influent supply.

21. The rotary water treatment system of claim 20 further comprising:
another open channel cell fluidly coupled to said at least one open channel cell;
another cylinder partially disposed in said another open channel cell, said another cylinder having a first end and a second end opposite said first end, and a cylinder wall coupled between said first end and said second end, said cylinder wall including a plurality of perforations formed in said cylinder wall.

22. The rotary water treatment system of claim 21 wherein said motive force element comprises a gear reduced motor coupled to said cylinder and said another cylinder configured to rotate about a long axis of said cylinder and said another cylinder.

23. The rotary water treatment system of claim 20, wherein said cylinder wall is configured to aerate said liquid on both an outer surface and an inner surface of said cylinder wall.

24. The rotary water treatment system of claim 20 wherein said cylinder is partially disposed in said liquid contained in said open channel cell, and more than half of said cylinder longitudinal cross section extending beyond said open channel cell.

25. The rotary water treatment system of claim 20 wherein the rotary treatment system is configured to increase dissolved oxygen content of the liquid contained in said at least one open channel cell.

26. The rotary water treatment system of claim 20 wherein said cylinder is configured to mix reduced liquid and oxygen rich liquid in said at least one open channel cell, wherein the mixture of said reduced liquid with the oxygen rich liquid increases dissolved oxygen content of said liquid contained in said at least one open channel cell.

27. The rotary water treatment system of claim 20 wherein said liquid comprises one of an acidic metal-laden water and an alkaline metal-laden water.

* * * * *